United States Patent
Zoller et al.

(10) Patent No.: US 9,389,686 B2
(45) Date of Patent: Jul. 12, 2016

(54) OPERATING DEVICE

(75) Inventors: Ingo Zoller, Hösbach (DE); Thorsten Alexander Kern, Alsbach (DE)

(73) Assignee: Continental Automotive GmbH, Hannover (DE)

(*) Notice: Subject to any disclaimer, the term of this patent is extended or adjusted under 35 U.S.C. 154(b) by 523 days.

(21) Appl. No.: 13/577,884

(22) PCT Filed: Feb. 8, 2011

(86) PCT No.: PCT/EP2011/051831
§ 371 (c)(1),
(2), (4) Date: Aug. 8, 2012

(87) PCT Pub. No.: WO2011/098453
PCT Pub. Date: Aug. 18, 2011

(65) Prior Publication Data
US 2012/0306798 A1     Dec. 6, 2012

(30) Foreign Application Priority Data
Feb. 9, 2010   (DE) .......................... 10 2010 007 486

(51) Int. Cl.
*G08B 6/00*     (2006.01)
*G06F 3/041*    (2006.01)
*G06F 3/01*     (2006.01)
*G06F 3/0488*   (2013.01)

(52) U.S. Cl.
CPC .............. *G06F 3/016* (2013.01); *G06F 3/041* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 6,169,469 B1 * | 1/2001 | Misumi | H01H 50/005 335/202 |
| 6,816,049 B2 | 11/2004 | Watanabe et al. | |
| 2004/0056745 A1 * | 3/2004 | Watanabe | G06F 3/016 335/220 |
| 2006/0109254 A1 | 5/2006 | Akieda et al. | |
| 2006/0109256 A1 | 5/2006 | Grant et al. | |
| 2006/0119586 A1 * | 6/2006 | Grant | G06F 3/016 345/173 |
| 2011/0037546 A1 | 2/2011 | Marie | |

FOREIGN PATENT DOCUMENTS

| | | |
|---|---|---|
| CN | 1484360 | 3/2004 |
| WO | WO 2009/130188 A2 | 10/2009 |

* cited by examiner

*Primary Examiner* — Jason Olson
*Assistant Examiner* — Krishna Neupane
(74) *Attorney, Agent, or Firm* — Cozen O'Connor

(57) ABSTRACT

An operating device having an operating element with haptic feedback. The operating element can be actuated by an operator by means of an input member, the operating device includes two ferromagnetic planar components and a flat coil. The largest surfaces of the ferromagnetic planar components are oriented toward each other and the components can be moved relative to each other. The flat coil is disposed between the ferromagnetic components and the ferromagnetic planar components can be moved toward each other by energizing the flat coil. The movement of one of the ferromagnetic planar components can be perceptible to the tactile sense of the operator on the operating element either directly or by a coupling device.

11 Claims, 4 Drawing Sheets

OPERATING DEVICE

CROSS REFERENCE TO RELATED APPLICATIONS

Figure 1A:
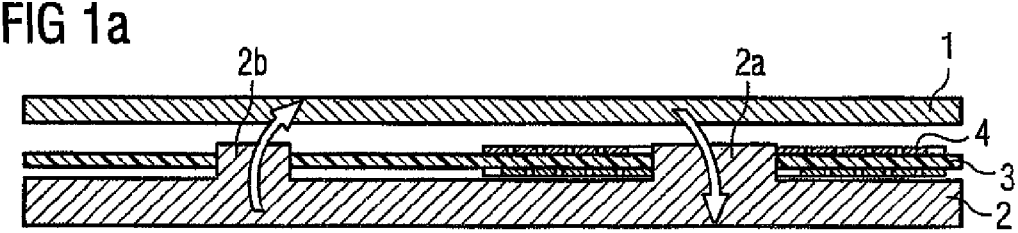

This is a U.S. national stage of application No. PCT/EP2011/051831, filed on 8 Feb. 2011. Priority is claimed on German Application No. 10 2010 007 486.1 filed 9 Feb. 2010, the content of which is incorporated here by reference.

BACKGROUND OF THE INVENTION

1. Field of the Invention

The invention relates to an operating device having an operating element with haptic feedback, the operating element has an input surface that can be actuated by an operator by an input member.

2. Description of Prior Art

Haptic feedback from operating elements is required when an operator cannot directly perceive the operating process being carried out. While an operator can perceive the opening or closing of the switching contacts by a changing haptic of the operating element in the case of operating devices with electromechanical switches, this is not necessarily the case with electronic switches. For this reason, in the prior art operating elements are known that provide haptic feedback about an operating process that has taken place by movements of the operating element which are perceptible to the operator. The known haptic operating elements, referred to as touch screens, require a large installation space, a complex drive and particular structural measures if they are to be used in surroundings characterized by particularly large differences in temperature, such as for example in a motor vehicle which has to remain operationally capable both in arctic cold as well as in summer heat.

SUMMARY OF THE INVENTION

An object of the invention is an operating device having an operating element with haptic feedback that requires a small installation space, is of simple design, and functions satisfactory even under difficult environmental conditions.

This object is achieved in that the operating device has two ferromagnetic planar components and a flat coil, wherein the largest surfaces of the ferromagnetic planar components are oriented with respect to one another and can be moved relative to one another, and wherein the flat coil is disposed between the ferromagnetic components. Furthermore, the input surface is configured either as part of one of the ferromagnetic planar components or is coupled by a coupling device to one of the ferromagnetic planar components. Finally, according to the invention the planar ferromagnetic components can be moved with respect to one another by energizing the flat coil, and the movement of one of the ferromagnetic components is perceptible to the tactile sense of the operator on the operating element either directly or by the coupling device. These planar components can have a largely planar surface, can have elevated portions, which are provided either as a coil core for the flat coils or else serve to concentrate the magnetic flux. By energizing the coil, a magnetic field is built up and the two ferromagnetic plates are attracted to one another. This movement is perceptible to the input member, for example a finger of the operator either directly or via the coupling device.

The flat coil can be manufactured in a particularly easy and durable fashion if it is implemented from conductor tracks on a printed circuit board. This can be done by etching a copper-laminated printed circuit board in such a way that there are conductor tracks in a coil shape remaining, wherein the conductor tracks are preferably disposed in a spiral-shaped fashion. However, other arrangements are basically also possible as long as these conductor tracks still have sufficient induction. Instead of etching the conductor tracks, the conductor tracks can also be implemented by printing a conductor track material, such as for example silver paste, onto printed circuit boards.

A particularly effective flat coil can be implemented if it is disposed on two sides of the printed circuit board. Furthermore, it is possible to dispose a plurality of printed circuit boards with flat coils one on top of the other to implement a correspondingly larger generation of force.

If the flat coil has a ferromagnetic coil core, the magnetic flux generated by the flat coil is directed and the force effect between the two ferromagnetic planar components is increased further.

The coil core can be implemented particularly easily if it is configured as part of one or two of the planar ferromagnetic components. In this way, no additional component is required and the position of the flat coil is secured.

If the operating device has a plurality of flat coils, the surface of the ferromagnetic planar components can be made larger without making the flat coil more complex. As a result of the use of two ferromagnetic planar components with a coil disposed between them it is in principle possible to pull the two ferromagnetic planar components very quickly together by energizing the flat coil and in this way leave behind a perceptible impression. When the energization of the flat coil stops, the two ferromagnetic planar components can resume their original position, by a spring element connected to one of the ferromagnetic planar components. It is in principle also possible to dispense with a spring element if the original position is restored by the action of gravity on the movable part.

If the operating device has three ferromagnetic planar components, wherein adjacent ferromagnetic planar components can be moved relative to one another and in each case at least one flat coil is disposed between the adjacent ferromagnetic planar components, it is possible to apply the force produced by the energization of the flat coils in two opposing directions, counter to the direction of movement of the input member or in the direction of movement of the input member, to generate different haptic impressions. A particularly simple design of the above-mentioned configuration is obtained if the middle ferromagnetic planar component of the ferromagnetic planar components has two elevated portions that form the coil cores of the flat coils. In this way, the flat coils are secured and at the same time the magnetic flux is concentrated.

If the operating device has an elastic element that defines the distance between the ferromagnetic planar components when the flat coils are not energized, operation of the operating element by the input member can be detected if the operating device has a distance-measuring device for measuring the distance between two adjacent ferromagnetic planar components. If a change in the distance is measured, it is assumed that the distance has been changed by the operating member and it is therefore possible to detect operation of the operating element. This measuring device can be simply implemented with very by virtue of the fact that it is configured as a measuring device for measuring the inductance of the flat coil or flat coils. There is therefore no need for an additional travel-measuring element. Instead, the already present flat coil can be used by simply measuring the inductance by an electronic circuit, for example a microcomputer, which is configured for actuating the operating device and possible other devices and is already present. The distance between the ferromagnetic planar components can also be easily measured capacitively. For this purpose, it is possible to dispose two additional conductive surfaces on a printed circuit board on which the flat coil or coils is/are disposed, the capacitance of which conductive surfaces changes as a result of a change in distance between the ferromagnetic planar components and the printed circuit board, and it is therefore possible to determine the distance between the two ferromagnetic planar components. The two conductive surfaces can be manufactured at the same time as the manufacture of the flat coils by etching a copper-laminated printed circuit board or printing with a conductive paste, and therefore require only minimum extra expenditure. The flat coils can also be used for measuring capacitance as long as they are not energized.

The operating element can be configured as a display. In the simplest case this display may be configured from a printed element with various digits in the form of a telephone keypad. It is therefore possible to select various digits if the operating element is touched with the operating member on the corresponding digits and the display has a corresponding device with which the position of the input member on the display can be determined. If the previously described display is configured as an electro-optical display, various menus, submenus or individual values can be represented on the display, which is then detected by correspondingly touching the display at the corresponding position of the representation of the menu, submenu or value to be selected. Such optoelectronic displays may be configured as a light-emitting diode matrix, organic light-emitting diode display or liquid crystal display and are already known from what are referred to as touch screens.

The flat coils are energized with a direct current or low-frequency alternating current to move the planar ferromagnetic components relative to one another. In addition, this current can be modulated with a frequency in the audible range such as, for example, 1 kilohertz, with the result that this frequency can be additionally heard. It is therefore possible for a click which sounds as if an electromechanical switch has been opened or closed to be audible.

Finally, the coil cores for the flat coils can be implemented by shaping the ferromagnetic planar components by deep drawing or recessing. As a result, the structure is further simplified and reduced in price.

Figure 1B:
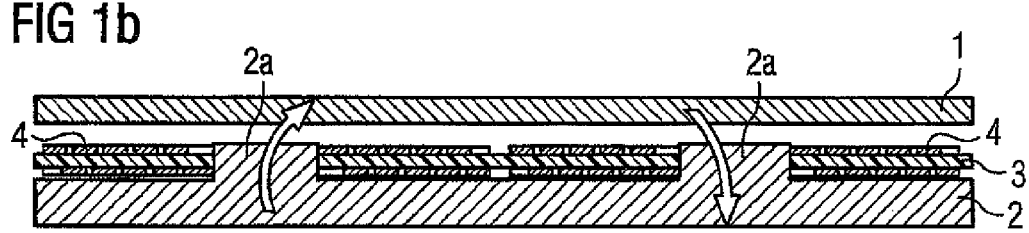
Figure 2:
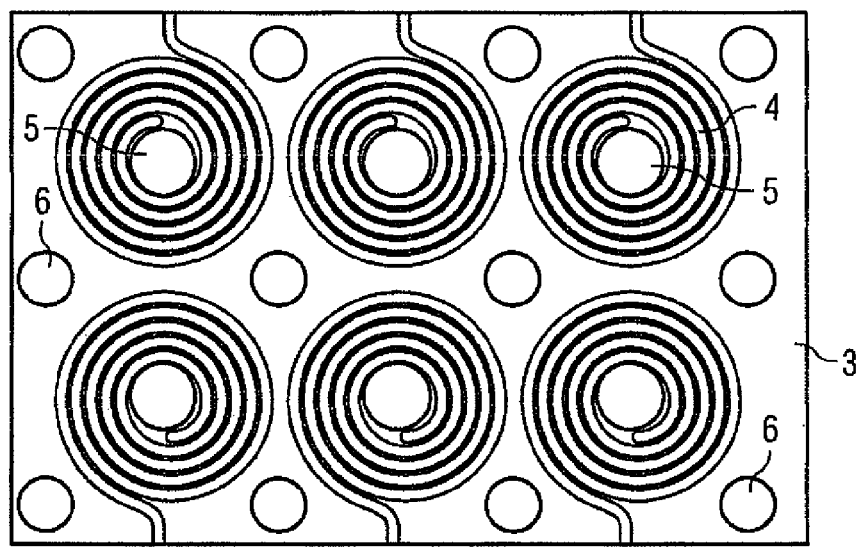
Figure 3:
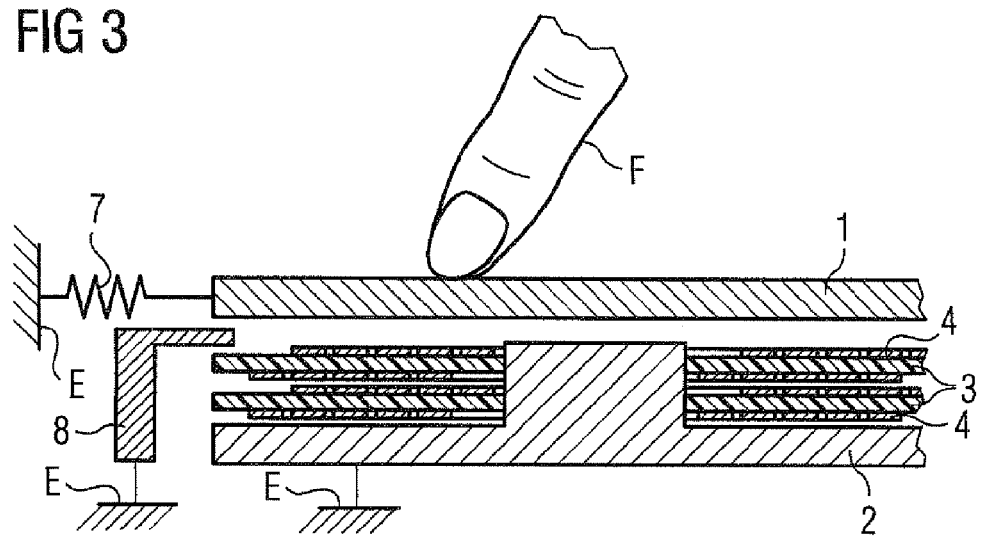
Figure 4:
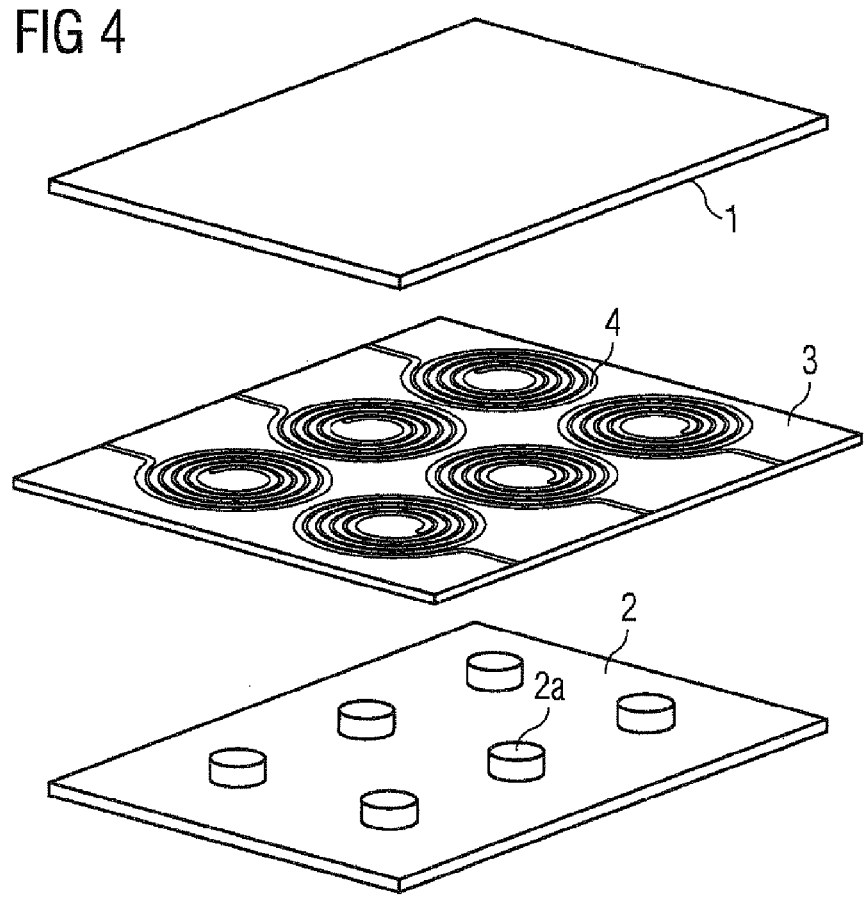
Figure 5:
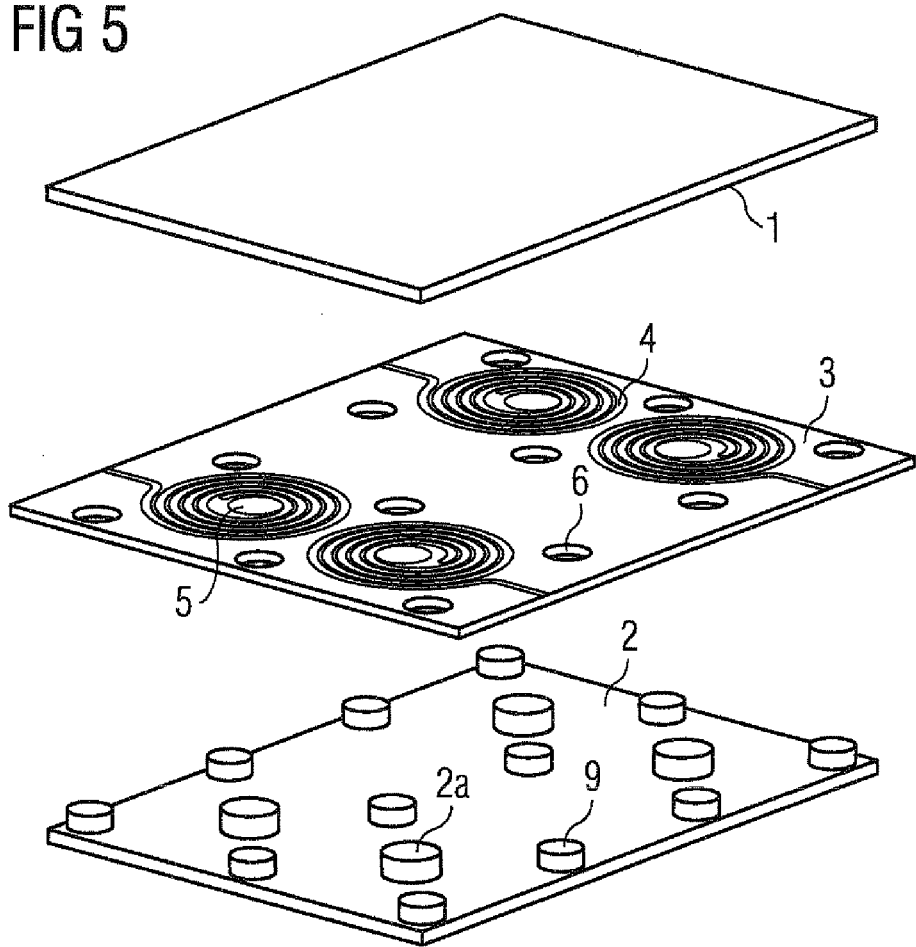
Figure 6:
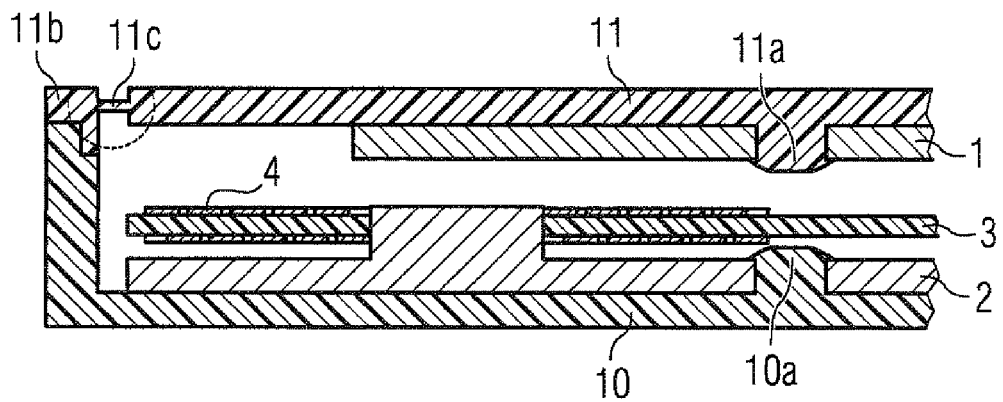
Figure 7:
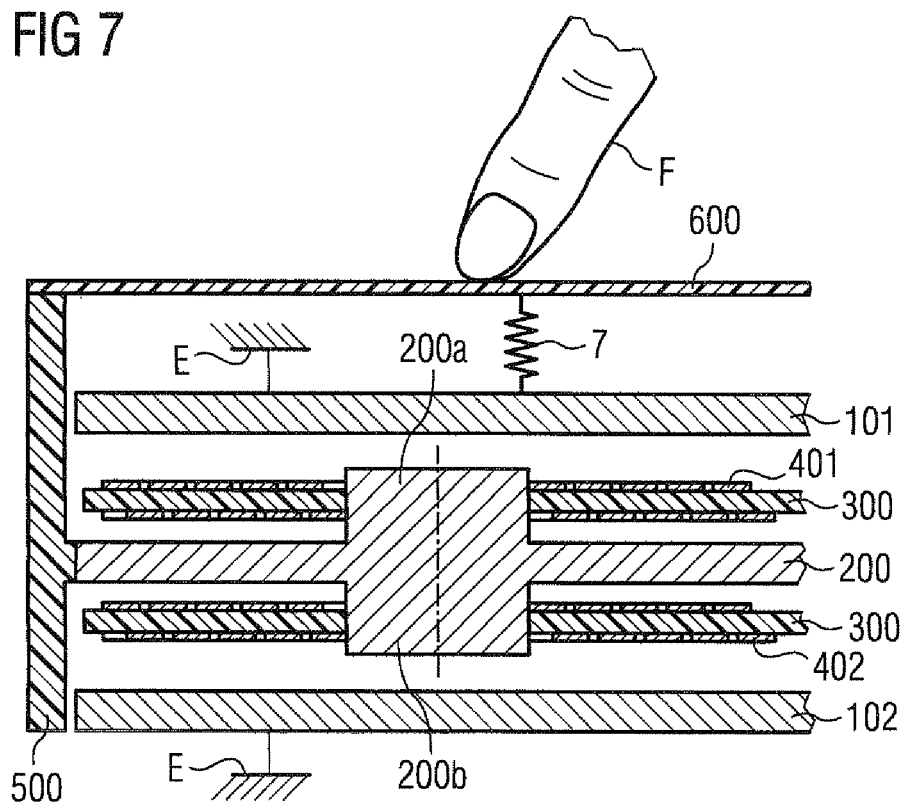
Figure 8:
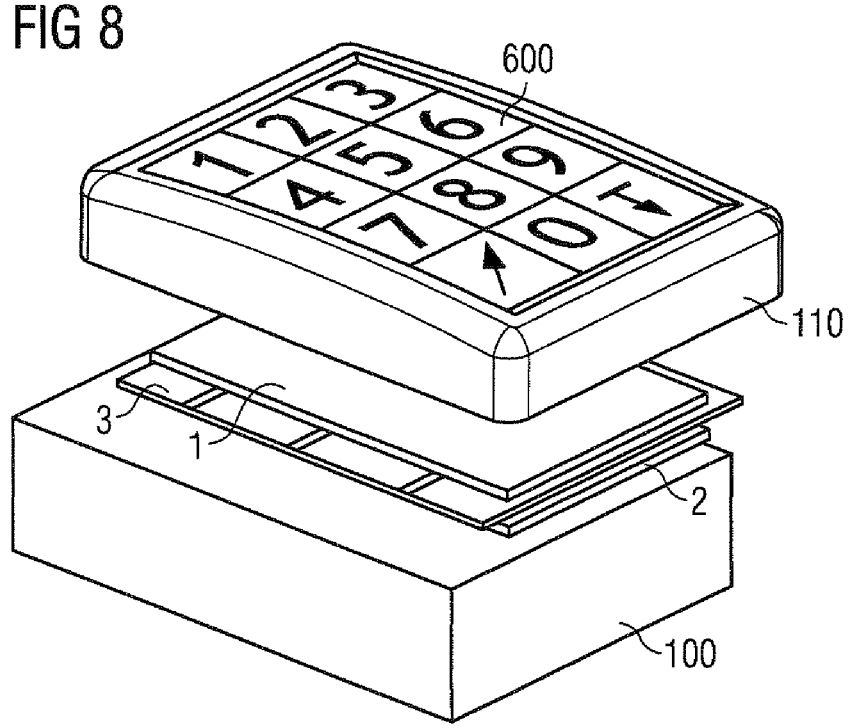

The invention will be explained in more detail below with reference to the figures, in which:

FIGS. 1a, 1b: each show an illustration of the haptic function of the operating device;

FIG. 2: is a plan view of a printed circuit board with flat coils,

FIG. 3: is a partial section through a first exemplary embodiment of the operating device;

FIG. 4: is an exploded view of two ferromagnetic planar components and a printed circuit board with flat coils;

FIG. 5: is an exploded view of two ferromagnetic planar components and a printed circuit board with flat coils;

FIG. 6: is a partial section through an exemplary embodiment of the operating device according to one embodiment of the invention;

FIG. 7: is an exemplary embodiment of the operating device according to one embodiment of the invention in a partial section; and FIG. 8: is an exploded illustration of an operating device according to one embodiment the invention.

DETAILED DESCRIPTION OF THE PREFERRED EMBODIMENTS

FIG. 1a shows two ferromagnetic planar components 1, 2, wherein the ferromagnetic planar component 2 has two elevated portions 2a, 2b. Furthermore, a printed circuit board 3 with a flat coil 4 is shown. The elevated portion 2a serves as a coil core of the flat coil 4. If a current flows through the flat coil 4, a magnetic flux, which is represented by the arrows, is impressed into the ferromagnetic planar components 1 and 2 and a magnetic circuit is therefore closed, with the result that the two ferromagnetic planar components 1, 2 are pulled together.

FIG. 1b differs from FIG. 1a in that two flat coils 4 are present which are disposed one next to the other on the printed circuit board 3, and in that instead of the elevated portion 2b a further elevated portion 2a is present which also serves as a coil core of one of the two flat coils. So that a magnetic flux like that illustrated by the arrows is generated, the two flat coils 4 illustrated must either have a different winding direction or must have a current flowing through them in different directions given the same winding direction.

In FIG. 2, a printed circuit board 3 and six flat coils 4 and openings 5 and 6 are shown. The openings 5 are disposed within the center of the flat coils and accommodate coil cores, for example the elevated portions 2a from FIG. 1. The openings 6 serve to accommodate elastic elements, which will be described in more detail later in conjunction with FIG. 5. In the present example, the flat coils 4 have been produced by etching the printed circuit board 3 which was originally fully laminated with copper. It is also possible to produce these flat coils by printing a printed circuit board with a conductive paste. The shape of the coils 4 does not necessarily have to correspond to the spiral shape illustrated. It is also possible to implement the coil in a rectangular meandering or elliptical fashion, but the illustrated spiral-shaped arrangement is preferred.

The partial section through an operating device according to the invention in FIG. 3 shows two ferromagnetic planar components 1, 2, two printed circuit boards 3, each with a flat coil 4, a spring element 7 and a stop 8. Furthermore, a ground symbol E and a finger F are recognized as input members of a possible operator. The ferromagnetic planar component constitutes the input surface of the operating element. The ground symbols E on the components 2, 7, and 8 mean that components 2, 7, and 8 assume a fixedly defined position. The spring element 7 holds the ferromagnetic planar component in a defined position without application of external force. If it is then detected that the finger touches the ferromagnetic planar component 1 or an operating element such as a display coupled to the ferromagnetic planar component 1, the flat coils 4 are energized, with the result that the ferromagnetic planar component 1 is pulled in the direction of the planar ferromagnetic component 2. The stop 8 prevents the two ferromagnetic planar components from touching. An operating member can be detected by virtue of the fact that the distance between the two ferromagnetic planar components 1, 2 is measured by a measuring device, and when the distance decreases contact is detected. Such a distance-measuring device is, however, not absolutely necessary. For example, it is also possible for the operating element to be configured as what is referred to as a touch screen connected to the ferromagnetic planar component 1by virtue of the fact that it is disposed directly above the ferromagnetic planar component. Such touch screens have a detection device that determines at what point of the touch screen an operating member touches the touch screen and therefore also touching of the operating element overall can be detected.

The two flat coils 4 increase the force effect on the ferromagnetic planar component 1, with the result that a particularly intensive haptic impression can be communicated.

The exploded illustration in FIG. 4 shows a ferromagnetic planar component 1, a ferromagnetic planar component 2 with six elevated portions 2a and a printed circuit board 3 with six flat coils 4. The elevated portions 2a serve as coil cores of the flat coils 4.

In the exploded illustration in FIG. 5, a ferromagnetic planar component 1, a ferromagnetic planar component 2 with elevated portions 2a and elastic elements 9 are shown. The elastic elements 9 are configured as silicone cylinders and therefore each act as a spring element and as a stop since they each can be compressed only to a certain extent. These elastic elements are guided during assembly through the openings 6 of the printed circuit board 3 so that the ferromagnetic planar component 1 rests on these elastic elements in the assembled state. The elastic elements 9 can also be configured, for example, in the shape of a cone, pyramid, right parallelepiped or as a similar spatial figure composed of an elastic material, for example silicone.

FIG. 6 shows a further refinement of an operating device according to the invention. In addition to the ferromagnetic planar components 1 and 2 and the printed circuit board 3 with the flat coil 4, a housing underside 10 and a housing lid 11 are shown. The housing underside 10 is manufactured by virtue of the fact that the ferromagnetic planar component 2 is partially encapsulated by injection molding with the housing underside in such a way that the rivet-shaped elevation 10a is injected through an opening in the ferromagnetic planar component 1, and the ferromagnetic planar component is therefore connected to the housing underside 10. In a similar form, the housing lid 11 is connected or coupled by a rivet-shaped elevated portion 11a to the ferromagnetic planar component 1. The housing lid 11 also has a housing lid frame 11b which is connected via a housing lid tapered portion 11c to the other part of the housing lid 11. The housing lid tapered portion 11c serves as a spring element which holds the housing lid 11 in a defined position as long as the flat coil 4 is not energized.

The partial section through the operating device in FIG. 7 shows ferromagnetic planar components 101, 102, 200, printed circuit boards 300 with flat coils 401, 402, a coupling device 500 and an operating element in the form of a touch screen 600, a spring element 7 and an operator's finger F. The ferromagnetic planar component 200 has elevated portions 200a, 200b which serve as coil cores of the flat coils 401, 402.

The ground symbols E again mean, as in FIG. 3, that the components connected to the ground symbols E (here the ferromagnetic planar components 101, 102) assume a fixed defined position.

If the coil 401 is energized, the ferromagnetic planar component 200 is pulled in the direction of the ferromagnetic planar component 101, with the result that the touch screen 600 is raised by the coupling device 500 and therefore the pressure on the finger F increases. If the flat coil 402 is energized, the ferromagnetic planar component 200 is pulled in the direction of the ferromagnetic planar component 102, with the result that the touch screen 600 is removed from the finger F, with the result that the pressure on the finger F is reduced. The touch screen 600 contains a detection device that detects the presence of the finger F. It is then possible to energize the coil 401 or 402 depending on which haptic impression is desired. It is also possible to energize the coils 401, 402 alternately in order therefore to generate an alternating upward and downward movement of the touch screen 600. A very large number of different haptic perception patterns can therefore be implemented depending on the energization of the coils 401, 402.

FIG. 8 shows the partial exploded illustration of an exemplary embodiment of an operating device according to the invention. The figure shows a housing underside 100, a housing lid 110 with a touch screen 600 and a ferromagnetic planar component 1 between the housing underside 100 and the housing lid 110, a printed circuit board 3 and a ferromagnetic planar component 2. Instead of the ferromagnetic planar components 1, 2 and the printed circuit board 3, a system as described in FIG. 7 can also be used. A ten-digit keypad is illustrated on the touch screen 600. Since the touch screen 600 has an opto-electronic display, it is, of course, also possible to represent, instead of the represented ten-digit keypad, any representable symbol, menu or submenu in succession. Different haptic effects can also be generated for various representations and selection possibilities. It is therefore possible, for example, to change the amplitude of the current and/or the frequency at which the flat coils 401, 402 switch on.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. An operating device, comprising:
an operating element with haptic feedback;
first and second ferromagnetic planar components configured to be movable relative to one another, the first and second ferromagnetic planar components arranged substantially parallel to each other;
a third ferromagnetic planar component arranged substantially parallel to each of the first and second ferromagnetic planar components and arranged between the first and second ferromagnetic planar components; and
at least one flat coil arranged between the first and third ferromagnetic planar components and at least one flat coil arranged between the third and second ferromagnetic planar components, each of the flat coils having a ferromagnetic coil core;
an input surface of the operating element configured to be actuated by an operator by an input member, the input surface being one of:
at least a part of one of the first and second ferromagnetic planar components and
coupled by a coupling device to one of the first and second ferromagnetic planar components,
wherein adjacent ones of the first, second and third ferromagnetic planar components are movable with respect to one another by energizing respective ones of the flat coils, the movement of one of the respective first, second and third ferromagnetic planar components is perceptible to a tactile sense of the operator on the operating element at least one of directly and by the coupling device, and
wherein the third ferromagnetic planar component includes respective elevated and downwardly extending portions as ferromagnetic coil cores for respective ones of the flat coils above and below the third ferromagnetic planar component.

2. The operating device as claimed in claim 1, wherein each of the flat coils is a conductor track on a printed circuit board.

3. The operating device as claimed in claim 2, wherein each of the flat coils is disposed on both sides of the printed circuit board.

4. The operating device as claimed in claim 1, further comprising an elastic element that defines a distance between adjacent ones of the first, second and third ferromagnetic planar components when the flat coils between the respective planar components are not energized.

5. The operating device as claimed in claim 1, further comprising a distance-measuring device configured to measure a distance between at least two of the ferromagnetic planar components.

6. The operating device as claimed in claim 5, wherein the distance-measuring device is configured to measure a change in inductance of at least one of the flat coils.

7. The operating device as claimed in claim 1, wherein the operating element comprises a display.

8. The operating device as claimed in claim 7, wherein the display comprises a device configured to determine a position of the input member on the display.

9. The operating device as claimed in claim 8, wherein the display is an electro-optical display.

10. The operating device as claimed in claim 1, wherein a current that is modulated in an audible frequency range is applied to at least one of the flat coils.

11. The operating device as claimed in claim 1, wherein the ferromagnetic coil cores are manufactured by shaping the third ferromagnetic planar component.

* * * * *